United States Patent
Nguyen et al.

(10) Patent No.: US 9,944,890 B2
(45) Date of Patent: Apr. 17, 2018

(54) REMOVING RESIN COATINGS FROM WELLBORE SURFACES

(71) Applicant: Halliburton Energy Services, Inc., Houston, TX (US)

(72) Inventors: Philip Nguyen, Houston, TX (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 25 days.

(21) Appl. No.: 15/028,137

(22) PCT Filed: Nov. 11, 2013

(86) PCT No.: PCT/US2013/069391
§ 371 (c)(1),
(2) Date: Apr. 8, 2016

(87) PCT Pub. No.: WO2015/069288
PCT Pub. Date: May 14, 2015

(65) Prior Publication Data
US 2016/0244700 A1 Aug. 25, 2016

(51) Int. Cl.
| | | |
|---|---|---|
| E21B 37/00 | (2006.01) | |
| E21B 37/06 | (2006.01) | |
| E21B 37/08 | (2006.01) | |
| C09K 8/035 | (2006.01) | |
| C09K 8/524 | (2006.01) | |
| C11D 3/20 | (2006.01) | |
| C11D 3/26 | (2006.01) | |
| C11D 3/28 | (2006.01) | |
| C11D 3/43 | (2006.01) | |
| C11D 11/00 | (2006.01) | |
| B08B 3/08 | (2006.01) | |
| C11D 7/06 | (2006.01) | |
| C11D 7/26 | (2006.01) | |
| C11D 7/50 | (2006.01) | |
| C09K 8/56 | (2006.01) | |
| E21B 41/00 | (2006.01) | |
| E21B 43/16 | (2006.01) | |
| E21B 43/267 | (2006.01) | |

(52) U.S. Cl.
CPC ............ *C11D 11/0041* (2013.01); *B08B 3/08* (2013.01); *C09K 8/524* (2013.01); *C11D 7/06* (2013.01); *C11D 7/265* (2013.01); *C11D 7/5013* (2013.01); *C11D 7/5022* (2013.01); *C09K 8/56* (2013.01); *E21B 41/00* (2013.01); *E21B 43/16* (2013.01); *E21B 43/267* (2013.01)

(58) Field of Classification Search
CPC .......... E21B 37/00; E21B 37/06; E21B 37/08; C09K 8/035; C09K 8/524; C11D 3/20; C11D 3/2096; C11D 3/26; C11D 3/28; C11D 3/3917; C11D 3/392; C11D 3/43; C11D 7/266
See application file for complete search history.

(56) References Cited

U.S. PATENT DOCUMENTS

| | | | | |
|---|---|---|---|---|
| 2,435,239 | A | | 2/1948 | Schub |
| 4,396,703 | A | * | 8/1983 | Matsumoto ............... B41C 1/10 101/465 |
| 4,508,634 | A | * | 4/1985 | Elepano ............... A61K 8/4973 134/38 |
| 4,541,489 | A | | 9/1985 | Wu |
| 5,106,525 | A | * | 4/1992 | Sullivan ................... C09D 9/00 134/38 |
| 5,288,335 | A | * | 2/1994 | Stevens .................... C09D 9/04 106/173.01 |
| 5,421,897 | A | * | 6/1995 | Grawe .................. B08B 7/0014 134/6 |
| 6,060,439 | A | | 5/2000 | Doyel et al. |
| 6,090,860 | A | * | 7/2000 | Peters ...................... C08J 11/06 521/40 |
| 6,179,931 | B1 | | 1/2001 | Kobayashi et al. |
| 6,454,868 | B1 | * | 9/2002 | Polakovic ............ H05K 3/0055 134/2 |
| 6,962,628 | B1 | | 11/2005 | Shibata et al. |

(Continued)

OTHER PUBLICATIONS

International Preliminary Report on Patentability issued in related Application No. PCT/US2013/069391, dated May 6, 2016 (7 pages).
International Search Report issued in related PCT Application No. PCT/US2013/069391 dated Aug. 21, 2014, 7 pages.
International Search Report and Written Opinion issued in PCT Application No. PCT/US2013/057655, dated May 19, 2014 (11 pages).
International Preliminary Report on Patentability issued in PCT Application No. PCT/US2013/057655, dated Mar. 10, 2016 (8 pages).

(Continued)

*Primary Examiner* — Charles Boyer
(74) *Attorney, Agent, or Firm* — Craig Roddy; Baker Botts L.L.P.

(57) ABSTRACT

Methods and compositions are provided for removing a residue of resin from the surface of equipment. In one embodiment, the methods comprise: providing a cleaning solution comprising a pH-adjusting agent, a chemical solvent, and water, wherein the chemical solvent is selected from the group consisting of β-lactam, γ-lactam, δ-lactam, ε-lactam, 2-pyrrolidone, N-methylpyrrolidone, 1,3-dimethyl-2-imidazolidinone (DMI), caprolactam, cyclohexanone, cyclopentanone, β-butyrolactone, γ-butyrolactone, δ-decalactone, γ-valerolactone, ε-caprolactone, butylene carbonate, propylene carbonate, and ethylene carbonate, any combination thereof, and any derivative thereof; allowing the cleaning solution to contact a surface at least partially coated with a layer of resin; and allowing the cleaning solution to at least partially dissolve the resin.

17 Claims, No Drawings

(56) References Cited

U.S. PATENT DOCUMENTS

| | | |
|---|---|---|
| 7,198,681 B2 | 4/2007 | Nguyen et al. |
| 8,105,989 B2 | 1/2012 | Svoboda et al. |
| 8,338,747 B2 | 12/2012 | Kon et al. |
| 8,377,324 B2 | 2/2013 | Fairbourn |
| 8,444,768 B2 | 5/2013 | Quillen et al. |
| 2005/0006096 A1 | 1/2005 | Nguyen et al. |
| 2005/0220743 A1* | 10/2005 | Nojiri ............... A61K 8/046 424/70.1 |
| 2007/0049510 A1* | 3/2007 | Fujii ............... C09D 9/00 510/201 |
| 2007/0261854 A1 | 11/2007 | Nguyen et al. |
| 2008/0135251 A1 | 6/2008 | Nguyen et al. |
| 2010/0035433 A1* | 2/2010 | Takemiya ............ C09G 1/02 438/693 |
| 2010/0314117 A1 | 12/2010 | Li et al. |
| 2011/0086223 A1 | 4/2011 | Sakamoto et al. |
| 2011/0146997 A1 | 6/2011 | Nguyen et al. |
| 2012/0046212 A1* | 2/2012 | Bourdette ............ C09D 9/04 510/206 |
| 2013/0143403 A1* | 6/2013 | Hong ............... C09K 13/00 438/689 |
| 2014/0027116 A1 | 1/2014 | Suresh et al. |
| 2016/0052845 A1* | 2/2016 | Kawamura ............ C07C 29/80 528/308.8 |

OTHER PUBLICATIONS

U.S. EPA HPV Challenge Program Revised Submission, y-Butyrolactone, Document No. 201-14672A, Aug. 15, 2003.
Office Action issued in U.S. Appl. No. 14/907,727, dated May 4, 2017 (23 pages).

* cited by examiner

REMOVING RESIN COATINGS FROM WELLBORE SURFACES

CROSS-REFERENCE TO RELATED APPLICATION

The present application is a U.S. National Stage Application of International Application No. PCT/US2013/069391 filed Nov. 11, 2013, which is incorporated herein by reference in its entirety for all purposes.

BACKGROUND

The present disclosure provides methods and compositions for removing resin coatings from the surfaces of wellbore equipment and preventing resin from curing in undesirable locations.

Hydrocarbon wells are often located in subterranean zones that contain unconsolidated particulates that may migrate within the subterranean formation with the oil, gas, water, and/or other fluids produced by a well penetrating the subterranean formation. As used herein, the term "unconsolidated particulate," and derivatives thereof, includes loose particulates and particulates bonded with insufficient bond strength to withstand the forces created by the production of fluids through the formation, which may include but are not limited to formation fines and/or proppant particulates. "Formation fine(s)," another term used herein, refers to any loose particles within the portion of the formation, including, but not limited to, formation fines, formation sand, clay particulates, coal fines, and the like. A similar situation can exist in certain wells where particulates referred to as "proppant particulates" may be introduced into the subterranean formation. The proppant particulates may be used in conjunction with hydraulic fracturing to prevent the fractures from fully closing upon the release of hydraulic pressure, forming conductive channels through which fluids may flow to the wellbore.

The presence of these unconsolidated particulates in produced fluids is often disadvantageous and undesirable in that the particulates may abrade pumping and other producing equipment and reduce the fluid production capabilities of producing zones. Unconsolidated subterranean zones include those that contain loose particulates and those wherein the bonded particulates have insufficient bond strength to withstand the forces produced by the production of fluids through the zones. "Zone" as used herein simply refers to a portion of the formation and does not imply a particular geological strata or composition.

One way to address the disadvantages caused by unconsolidated particulates is to introduce a resin into the unconsolidated subterranean zone. The resins used in these types of applications may comprise any of numerous types of polymerized synthetics or chemically modified natural resins including thermoplastic materials and thermosetting materials. In addition to maintaining a relatively solids-free production stream, consolidating particulates also aids in protecting the conductivity of the formation. Such consolidation treatments involve the injection of a resin in liquid form into the formation and thereafter causing the resin to cure to an infusible state known as thermosetting. The cured resin cements the sand grains or other unconsolidated particulates together by providing high strength, and, ideally, retaining high percentage of initial formation permeability ("Regain Permeability").

One disadvantage associated with using curable resins is the removal and clean up of the resin from equipment used in placing the resin. For example, a residue of resin may remain on fracturing equipment used during fracturing operations. This includes, but is not limited to, connecting hoses, valves, sand hoppers, sand screws, blender tubs, and the like. Without proper cleaning or removal, there is potential that a layer of resin may build up each time the equipment surface is exposed to the resin. The buildup of resin could result in plugging of equipment or causing the equipment not to function properly. Moreover, particulates, such as sand or proppant, may become entrapped within the resin and lead to further equipment damage The current clean-up solutions depend on the use of glycol ether type mutual solvent to thin down and remove the coated resin. This type of mutual solvent is currently considered toxic in many parts of the world. Moreover, in some areas of the United States, glycol ether mutual solvents cannot be used in well treatments or in the cleaning of equipment after being exposed to curable resins or tackifying agents.

DESCRIPTION OF PREFERRED EMBODIMENTS

The present disclosure provides methods and compositions for removing resin coatings from the surfaces of wellbore equipment and preventing resin from curing in undesirable locations.

The methods and compositions of the present disclosure generally involve removing a resin coating from a surface by applying to the surface a cleaning solution comprising a pH-adjusting agent, a solvent, and water. The chemical solvents are typically used in liquid form, among other reasons, so they can form the cleaning solution more easily. One of the potential advantages of the methods of the present disclosure is that the enhanced ease of removing resin from surfaces may enhance operators' willingness to and/or confidence in using a resin system for sand consolidation. In some cases, the methods and compositions of the present disclosure may provide additional environmental benefits, including but not limited to reduced toxicity.

Resins that may be suitable for treatment according to the present disclosure include any resins known in the art that are capable of forming a hardened, consolidated mass. Types of suitable resins include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. It is within the ability of one skilled in the art, with the benefit of this disclosure, to select a suitable resin for use in embodiments of the present disclosure.

Two-Component Epoxy Resins

One resin suitable for treatment according to the present disclosure is a two-component epoxy based resin comprising a hardenable resin component and a hardening agent component. The hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include the geographic location of the well and the surrounding weather conditions.

An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a organosilane coupling agent, a surfactant, an optional hydrolyzable ester for, among other things, breaking gelled fracturing fluid films on the proppant particles, and an optional liquid carrier fluid for, among other things, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be used in the hardenable resin component include, but are not limited to, organic resins such as bisphenol A diglycidyl ether resin, butoxymethyl butyl glycidyl ether resin, bisphenol A-epichlorohydrin resin, polyepoxide resin, novolak resin, polyester resin, phenol-aldehyde resin, urea-aldehyde resin, furan resin, urethane resin, a glycidyl ether resin, and combinations thereof. The hardenable resin used is included in the hardenable resin component in an amount in the range of from about 60% to about 100% by weight of the hardenable resin component. In some embodiments the hardenable resin used is included in the hardenable resin component in an amount of about 70% to about 90% by weight of the hardenable resin component. Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use according to the methods in the present disclosure. Some preferred solvents are those having high flash points (e.g., about 125° F.) because of, among other things, environmental and safety concerns. Such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

As described above, use of a solvent in the hardenable resin component is optional but may be desirable to reduce the viscosity of the hardenable resin component for ease of handling, mixing, and transferring. It is within the ability of one skilled in the art, with the benefit of this disclosure, to determine if and how much solvent is needed to achieve a suitable viscosity. In some embodiments the amount of the solvent used in the hardenable resin component is in the range of from about 0.1% to about 30% by weight of the hardenable resin component. Optionally, the hardenable resin component may be heated to reduce its viscosity, in place of, or in addition to, using a solvent.

Examples of the hardening agents that can be used in the liquid hardening agent component of the two-component consolidation fluids include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl) phenol, and 2-(N2N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F. The hardening agent used is included in the liquid hardening agent component in an amount sufficient to consolidate the coated particulates. In some embodiments, the hardening agent used is included in the liquid hardenable resin component in the range of from about 40% to about 60% by weight of the liquid hardening agent component. In some embodiments, the hardenable resin used is included in the hardenable resin component in an amount of about 45% to about 55% by weight of the liquid hardening agent component.

An organosilane coupling agent may be used, among other things, to act as a mediator to help bond the resin to formation particulates and/or proppant. Any organosilane coupling agent that is compatible with the resin and facilitates the coupling of the resin to the surface of the particulates is suitable for use in the resins that may be treated according to the present disclosure. Examples of organosilane coupling agents include, but are not limited to, N-2-(aminoethyl)-3-aminopropyltrimethoxysilane; 3-glycidoxypropyltrimethoxysilane; γ-aminopropyltriethoxysilane; N-β-(aminoethyl)-γ-aminopropyltrimethoxysilanes, aminoethyl-N-β-(aminoethyl)-γ-aminopropyl-trimethoxysilanes; γ-ureidopropyl-triethoxysilanes; β-(3-4 epoxy-cyclohexyl)-ethyl-trimethoxysilane; and γ-glycidoxypropyltrimethoxysilanes; vinyltrichlorosilane; vinyltris (β-methoxyethoxy) silane; vinyltriethoxysilane; vinyltrimethoxysilane; 3-metacryloxypropyltrimethoxysilane; β-(3,4 epoxycyclohexyl)-ethyltrimethoxysilane; r-glycidoxypropyltrimethoxysilane; r-glycidoxypropylmethylidiethoxysilane; N-β (aminoethyl)-r-aminopropyl-trimethoxysilane; N-β(aminoethyl)-r-aminopropylmethyldimethoxysilane; 3-aminopropyl-triethoxysilane; N-phenyl-r-aminopropyltrimethoxysilane; r-mercaptopropyltrimethoxysilane; Vinyltrichlorosilane; vinyltris (β-methoxyethoxy) silane; Vinyltrimethoxysilane; r-metacryloxypropyltrimethoxysilane; β-(3,4 epoxycyclohexyl)-ethyltrimethoxysilane; r-glycidoxypropyltrimethoxysilane; r-glycidoxypropylmethylidiethoxysilane; N-β-(aminoethyl)-r-aminopropyltrimethoxysilane; N-(β-(aminoethyl)-r-aminopropylmethyldimethoxysilane; r-aminopropyltriethoxysilane; N-phenyl-r-aminopropyltrimethoxysilane; r-mercaptopropyltrimethoxysilane; and combinations thereof. The organosilane coupling agent used is included in the hardening agent component in an amount capable of sufficiently bonding the resin to the particulate. In some embodiments, the organosilane coupling agent used is included in the hardenable resin component in the range of from about 0.1% to about 3% by weight of the hardening agent component.

Any surfactant compatible with the hardening agent and capable of facilitating the coating of the resin onto particles in the subterranean formation may be used in the hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. The surfactant or surfactants used are included in the liquid hardening agent component in an amount in the range of from about 1% to about 10% by weight of the liquid hardening agent component.

While not required, examples of hydrolysable esters that can be used in the hardening agent component of the integrated consolidation fluids of the present invention include, but are not limited to, a mixture of dimethylglutarate, dimethyladipate, and dimethylsuccinate; sorbitol; catechol; dimethylthiolate; methyl salicylate; dimethyl salicylate; dimethylsuccinate; ter-butylhydroperoxide; and combinations thereof. When used, a hydrolyzable ester is included in the hardening agent component in an amount in the range of from about 0.1% to about 3% by weight of the hardening agent component. In some embodiments a hydrolysable ester is included in the hardening agent component in an amount in the range of from about 1% to about 2.5% by weight of the hardening agent component.

Use of a diluent or liquid carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. Some preferred liquid carrier fluids are those having high flash points (e.g., about 125° F.) because of, among other things, environmental and safety concerns; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred liquid carrier fluids include aqueous dissolvable solvents such as, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate liquid carrier fluid is dependent on the resin composition chosen and is within the ability of one skilled in the art with the benefit of this disclosure.

Furan Resins

Another resin suitable for treatment according to the present disclosure is a furan-based resin. Suitable furan-based resins include, but are not limited to, furfuryl alcohol resins, mixtures furfuryl alcohol resins and aldehydes, and a mixture of furan resins and phenolic resins. Of these, furfuryl alcohol resins are preferred. A furan-based resin may be combined with a solvent to control viscosity if desired. Suitable solvents for use in the furan-based consolidation fluids of the present invention include, but are not limited to isopropyl alcohol, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred.

Phenolic Resins

Still another resin suitable for treatment according to the present disclosure is a phenolic-based resin. Suitable phenolic-based resins include, but are not limited to, terpolymers of phenol, phenolic formaldehyde resins, and a mixture of phenolic and furan resins. Of these, a mixture of phenolic and furan resins is preferred. A phenolic-based resin may be combined with a solvent to control viscosity if desired. Suitable solvents for use in the phenolic-based consolidation fluids of the present invention include, but are not limited to butyl acetate, butyl lactate, furfuryl acetate, and 2-butoxy ethanol. Of these, 2-butoxy ethanol is preferred.

Aqueous-Based Resin Consolidation System

In certain embodiments, the resin treated according to the present disclosure may be introduced through the wellbore in the form of a consolidation fluid comprising an aqueous base, an emulsified resin, and a hardening agent. The aqueous base fluids used in the consolidation fluid may comprise fresh water, saltwater, brine (e.g., saturated saltwater), seawater, or combinations thereof, and may be from any source, provided that they do not contain components that might adversely affect the stability and/or performance of the consolidation fluid. The hardening agent may comprise any of the hardening agents identified above.

Any of the resins identified above may be introduced through the wellbore as an emulsified resin. In some embodiments, the emulsified resin may be emulsified prior to being suspended or dispersed in the aqueous base fluid. By using a resin emulsifier prior to being suspended or dispersed in the aqueous base fluid, particular embodiments may offer the advantage of easier handling and require less preparation in the field. Examples of suitable emulsifying agents may include, but are not limited to, surfactants, proteins, hydrolyzed proteins, lipids, glycolipids, and nano-sized particulates, such as fumed silica.

Generally, the emulsified resin may be provided in any suitable form, including particle form, which may be a solid and/or liquid. In those embodiments where the resin is provided in a particle form, the size of the particle can vary widely. In some embodiments, the resin particles may have an average particle diameter of about 0.01 micrometers ("μm") to about 500 μm. In some embodiments, the resin particles may have an average particle diameter of about 0.1 μm to about 100 μm. In some embodiments, the resin particle may have an average particle diameter of about 0.5 μm to about 10 μm. The size distribution of the resin particles used in a particular composition or method may depend upon several factors including, but not limited to, the size distribution of the particulates present in the subterranean formation, the effective porosity and/or permeability of the subterranean formation, pore throat size and distribution, and the like.

Cleaning Solution

Regardless of the type of resin used, in certain cases, a residue of uncured resin may build up on the surface of equipment used to place the resin. According to the present disclosure, a cleaning solution may be used to remove the uncured resin from the surface of the equipment. The cleaning solution may comprise a chemical solvent, a pH-adjusting agent, and water.

A variety of chemical solvents may be used according to the embodiments of the present disclosure. Examples of solvents that may be suitable for use in the methods and compositions of the present disclosure include amides including lactams such as β-lactam, γ-lactam, δ-lactam, and ε-lactam, and their derivatives such as 2-pyrrolidone, N-methylpyrrolidone (NMP), 1,3-dimethyl-2-imidazolidinone (DMI), or caprolactam. Other examples of solvents that may be suitable for use in the methods of the present disclosure include cyclic ketones such as cyclohexanone, cyclopentanone and their derivatives. Still other examples of solvents that may be suitable for use in the methods of the present disclosure include β-butyrolactone, γ-butyrolactone, δ-decalactone, γ-valerolactone, ε-caprolactone, butylene carbonate, propylene carbonate, and ethylene carbonate. The solvents may be used individually or in combination.

A person of ordinary skill in the art would be able to select the appropriate pH-adjusting agent for a particular resin based on the teachings of the present disclosure. In certain embodiments, the pH-adjusting agent may be a pH-lowering agent, including but not limited to, acetic acid, hydrochloric acid solution (e.g., 38% by weight), citric acid, etc. The pH-lowering agent may be used to decrease the pH to less than about 2, among other reasons, to stop the curing of epoxy resins. In other embodiments, the pH-adjusting agent may be a pH-raising agent, including but not limited to, potassium hydroxide solution (e.g., 40-45% by weight), sodium hydroxide solution (e.g., 40% by weight), etc. The pH-raising agent may be used to increase the pH to above about 11, among other reasons, to stop the curing of furan resins. One of ordinary skill in the art will appreciate that other concentrations of active pH-adjusting agents in solutions may be utilized in addition to those previously set forth.

A person of ordinary skill in the art with the benefit of this disclosure would be able to determine the appropriate proportions of the cleaning solution based on the teachings of the present disclosure. In certain embodiments, the pH-adjusting agent may be present in a range of 0.1% to 10% volume by volume. In a preferred embodiments, the pH-adjusting agent may be present in a range of 1% to 5% volume by volume. In preferred embodiments, acetic acid may be present in a range of 3% to 5% volume by volume or hydrochloric acid may be present in a range of 1% to 2% volume by volume. In other preferred embodiments, potassium hydroxide or sodium hydroxide may be present in a range of 3% to 5% volume by volume. In certain embodiments, the solvent may be present in a range of 1% to 50% volume by volume. In a preferred embodiments, the solvent may be present in a range of preferred, 5% to 25% volume by volume. In just one example, the cleaning solution comprises 3 to 5% acetic acid, 5 to 15% γ-butyrolactone, and the balance fresh water.

The methods and compositions of the present invention may be used to clean a surface by removing resin that is substantially uncured as well as resin that has at least partially cured. In certain embodiments, the methods and compositions of the present disclosure may be used to remove resin that is substantially uncured. Removing the substantially uncured resin may prevent permanent damage resulting from the resin curing in an undesirable location. In other embodiments, the methods and compositions of the present disclosure may be used to remove a resin that has at least partially cured from the surface.

In certain embodiments, the methods and compositions of the present disclosure may be used to remove resin from equipment including, but not limited to, connecting hoses, valves, sand hoppers, sand screws, and blender tubs. The methods of the present disclosure can be used to save the cost of replacing these parts and prevent down time associated with part failure.

An embodiment of the present disclosure is a method comprising: providing a cleaning solution comprising a pH-adjusting agent, a chemical solvent, and water, wherein the chemical solvent is selected from the group consisting of β-lactam, γ-lactam, δ-lactam, ε-lactam, 2-pyrrolidone, N-methylpyrrolidone, 1,3-dimethyl-2-imidazolidinone (DMI), caprolactam, cyclohexanone, cyclopentanone, β-butyrolactone, γ-butyrolactone, δ-decalactone, γ-valerolactone, ε-caprolactone, butylene carbonate, propylene carbonate, and ethylene carbonate, any combination thereof, and any derivative thereof; allowing the cleaning solution to contact a surface at least partially coated with a layer of resin; and allowing the cleaning solution to at least partially dissolve the resin. Optionally, the resin is uncured. Optionally, the resin has been at least partially cured onto a surface. Optionally, the chemical solvent is present in an amount of about 5% to about 25% by volume. Optionally, the chemical solvent comprises γ-butyrolactone. Optionally, the pH-adjusting agent is present in an amount of about 1% to about 5% by volume. Optionally, the pH-adjusting agent comprises acetic acid. Optionally, the pH-adjusting agent comprises diluted potassium hydroxide. Optionally, resin comprises a two-component epoxy resin. Optionally, the resin comprises a furan resin.

An additional embodiment of the present disclosure is a method comprising: providing a cleaning solution comprising a pH-adjusting agent, a chemical solvent, and water, wherein the chemical solvent is selected from the group consisting of β-lactam, γ-lactam, δ-lactam, ε-lactam, 2-pyrrolidone, N-methylpyrrolidone, 1,3-dimethyl-2-imidazolidinone (DMI), caprolactam, cyclohexanone, cyclopentanone, β-butyrolactone, γ-butyrolactone, δ-decalactone, γ-valerolactone, ε-caprolactone, butylene carbonate, propylene carbonate, and ethylene carbonate, any combination thereof, and any derivative thereof, wherein the chemical solvent is present in an amount of about 5% to about 25% by volume, and wherein the pH-adjusting agent is present in an amount of about 1% to about 5% by volume; allowing the cleaning solution to contact a surface at least partially coated with a layer of resin; and allowing the cleaning solution to at least partially dissolve the resin. Optionally, the chemical solvent comprises γ-butyrolactone. Optionally, the pH-adjusting agent comprises acetic acid. Optionally, the pH-adjusting agent comprises diluted potassium hydroxide.

An additional embodiment of the present disclosure is a composition comprising: a pH-adjusting agent, a chemical solvent, and water, wherein the chemical solvent is selected from the group consisting of β-lactam, γ-lactam, δ-lactam, ε-lactam, 2-pyrrolidone, N-methylpyrrolidone, 1,3-dimethyl-2-imidazolidinone (DMI), caprolactam, cyclohexanone, cyclopentanone, β-butyrolactone, γ-butyrolactone, δ-decalactone, γ-valerolactone, ε-caprolactone, butylene carbonate, propylene carbonate, and ethylene carbonate, any combination thereof, and any derivative thereof. Optionally, the chemical solvent is present in an amount of about 5% to about 25% by volume. Optionally, the chemical solvent comprises γ-butyrolactone. Optionally, the pH-adjusting agent is present in an amount of about 1% to about 5% by volume. Optionally, the pH-adjusting agent comprises acetic acid. Optionally, the pH-adjusting agent comprises diluted potassium hydroxide.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a cleaning solution comprising a pH-adjusting agent, a chemical solvent, and water, wherein the chemical solvent is selected from the group consisting of β-lactam, γ-lactam, δ-lactam, ε-lactam, 2-pyrrolidone, N-methylpyrrolidone, 1,3-dimethyl-2-imidazolidinone (DMI), caprolactam, cyclohexanone, cyclopentanone, β-butyrolactone, γ-butyrolactone, δ-decalactone, γ-valerolactone, ε-caprolactone, butylene carbonate, propylene carbonate, and ethylene carbonate, any combination thereof, and any derivative thereof, wherein the chemical solvent is present in an amount of about 5% to about 25% by volume, and wherein the pH-adjusting agent is present in an amount of about 1% to about 5% by volume;
allowing the cleaning solution to contact a surface of equipment comprising a device selected from the group consisting of a hose, a valve, a sand hopper, a sand screw, and a blender tub, wherein the equipment has been used to introduce a resin into a wellbore penetrating a subterranean formation, and wherein a layer of the resin resides on at least part of the surface; and
allowing the cleaning solution to at least partially dissolve the resin.

2. The method of claim 1 wherein the resin is at least partially uncured.

3. The method of claim 1 wherein the resin is at least partially cured.

4. The method of claim 1 wherein the chemical solvent comprises γ-butyrolactone.

5. The method of claim 1 wherein the pH-adjusting agent comprises acetic acid.

6. The method of claim 1 wherein the pH-adjusting agent comprises potassium hydroxide.

7. The method of claim 1 wherein the resin comprises a two-component epoxy resin.

8. The method of claim 1 wherein the resin comprises a furan resin.

9. A method comprising:
providing a cleaning solution comprising a pH-adjusting agent, a chemical solvent, and water, wherein the chemical solvent is selected from the group consisting of β-lactam, γ-lactam, δ-lactam, ε-lactam, 2-pyrrolidone, N-methylpyrrolidone, 1,3-dimethyl-2-imidazolidinone (DMI), caprolactam, cyclohexanone, cyclopentanone, 3-butyrolactone, γ-butyrolactone, δ-decalactone, γ-valerolactone, ε-caprolactone, butylene carbonate, propylene carbonate, and ethylene carbonate, any combination thereof, and any derivative thereof, wherein the chemical solvent is present in an amount of about 5% to about 25% by volume, and wherein the pH-adjusting agent is present in an amount of about 1% to about 5% by volume;
introducing the cleaning solution into a wellbore penetrating a subterranean formation,
allowing the cleaning solution to contact a surface within the wellbore or the subterranean formation, wherein a layer of resin resides on at least part of the surface; and
allowing the cleaning solution to at least partially dissolve the resin.

10. The method of claim 9 wherein the chemical solvent comprises γ-butyrolactone.

11. The method of claim 9 wherein the pH-adjusting agent comprises acetic acid.

12. The method of claim 9 wherein the pH-adjusting agent comprises diluted potassium hydroxide.

13. A composition consisting of: a pH-adjusting agent, a chemical solvent, and water, wherein the chemical solvent is selected from the group consisting of β-lactam, γ-lactam, δ-lactam, ε-lactam, 2-pyrrolidone, N-methylpyrrolidone, 1,3-dimethyl-2-imidazolidinone (DMI), caprolactam, cyclohexanone, cyclopentanone, β-butyrolactone, γ-butyrolactone, δ-decalactone, γ-valerolactone, ε-caprolactone, butylene carbonate, propylene carbonate, and ethylene carbonate, any combination thereof, and any derivative thereof, wherein the chemical solvent is present in an amount of from about 5% to about 25% by volume.

14. The composition of claim 13 wherein the chemical solvent comprises γ-butyrolactone.

15. The composition of claim 13 wherein the pH-adjusting agent is present in an amount of from about 1% to about 5% by volume.

16. The composition of claim 13 wherein the pH-adjusting agent comprises acetic acid.

17. The composition of claim 13 wherein the pH-adjusting agent comprises potassium hydroxide.

* * * * *